April 12, 1966     E. L. McCARTHY ETAL     3,245,205
METHOD AND APPARATUS FOR PROCESSING A NATURAL GAS STREAM
Filed May 13, 1963
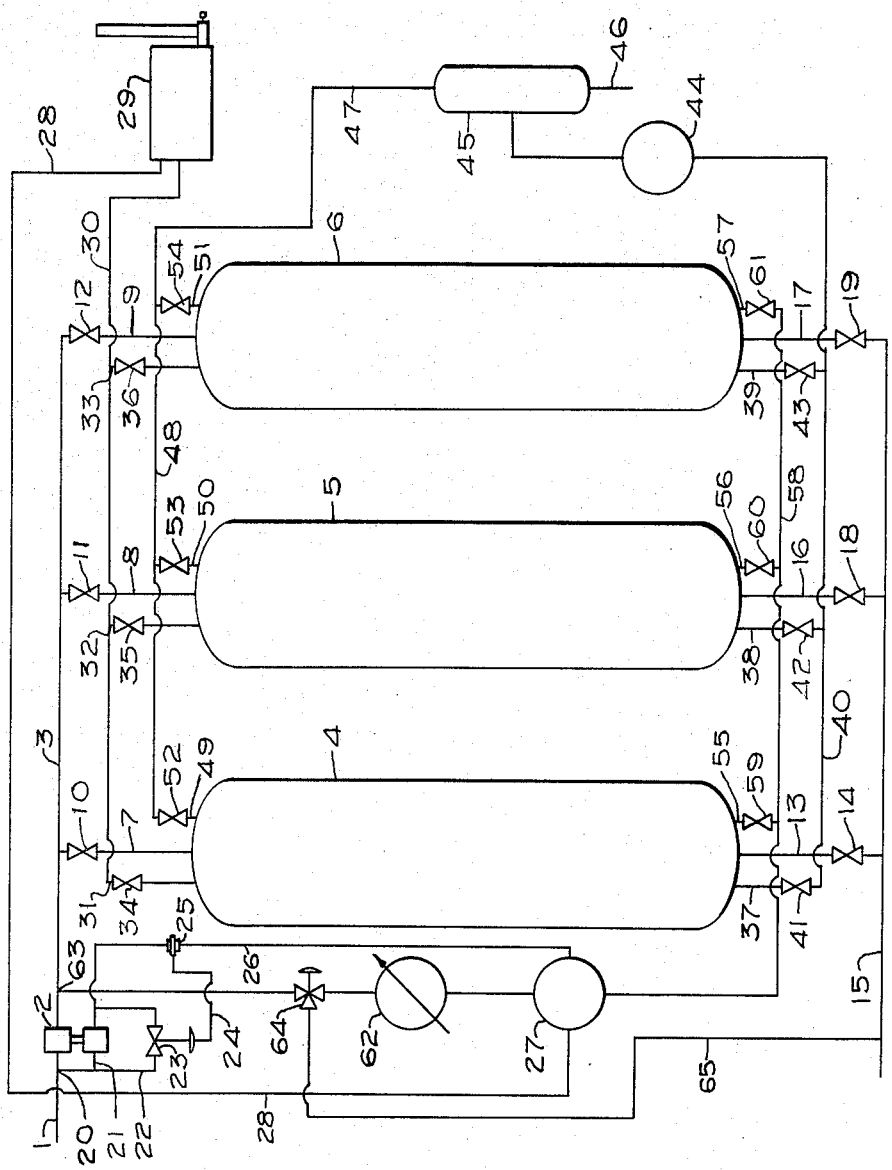
EUGENE L. McCARTHY,
ROBERT E. McMINN &
MARVIN S. WORLEY
        INVENTORS
BY
ATTORNEY United States Patent Office 3,245,205
Patented Apr. 12, 1966

3,245,205
METHOD AND APPARATUS FOR PROCESSING A NATURAL GAS STREAM
Eugene L. McCarthy, Robert E. McMinn, and Marvin S. Worley, Oklahoma City, Okla., assignors to Black, Sivalls & Bryson, Inc., Kansas City, Mo., a corporation of Delaware
Filed May 13, 1963, Ser. No. 280,037
7 Claims. (Cl. 55—62)

The present application is a continuation-in-part of our co-pending application Serial No. 37,422, filed June 20, 1960, now abandoned.

The present invention relates generally to a process and apparatus for adsorbing certain components from a fluid stream. More particularly, the present invention is directed to an improved process and apparatus for adsorbing desirable hydrocarbons from a natural gas stream and recovering the adsorbed heavier hydrocarbons separately from the natural gas stream.

Prior processes for recovering desirable heavier hydrocarbons have been directed to a closed cycle regeneration system in which a regeneration gas stream is continuously circulated through a circuit in which the desirable heavier hydrocarbons are vaporized from the adsorbent material and then are condensed and separated from the regeneration stream. Other prior processes utilize an open regeneration system wherein sufficient pressure drop is imposed on the main gas stream by a pressure reducing valve and the regeneration gas stream is diverted from the main gas stream ahead of such pressure reducing valve on the main gas stream. This regeneration gas stream then flows through an adsorbent regeneration and hydrocarbon recovery system and is returned to the main gas stream downstream of the pressure reducing valve. Many installations of systems for processing a natural gas stream have only very limited pressure available in excess of pipeline or other pressure delivery specification and therefore a closed system would ordinarily be necessary without the novel process and apparatus of the present invention.

In all prior systems for the adsorption and recovery of desirable heavier hydrocarbons from a natural gas stream it has been found necessary to cool the adsorbent material after its regeneration by hot gas in order to assure that the adsorbent material will be properly regenerated and ready to commence its adsorption function. In many of the prior systems the regeneration gas stream is first passed through a hot bed of adsorbent material to cool the bed and to preheat the regeneration gas stream and then passed through a heater into a bed of adsorbent material to vaporize the components adsorbed by the adsorbent material. We have found that this use of the regeneration gas stream in an open type regeneration system is disadvantageous since the stream, while cooling the hot regenerated bed of adsorbent material, will also presaturate a substantial portion of this bed of adsorbent material with the heavier hydrocarbons to be recovered.

Therefore, the primary object of the present invention is to provide a novel process and apparatus for the recovery of desirable heavier hydrocarbons from a natural gas stream. A further object of the present invention is to provide a novel open type adsorption process for hydrocarbon recovery from a natural gas stream. A still further object of this invention is to provide an adsorption process with an open type regeneration system having a substantially reduced pressure loss necessary to operate the regeneration system. Another object of the present invention is to provide a hydrocarbon adsorption recovery process wherein cooling of the hot regenerated beds of adsorption material does not result in partial presaturation of the bed of adsorption material with the hydrocarbon components which are to be recovered.

In accomplishing these and other objects of the present invention, we have provided improved details of structure, the preferred form of which is illustrated in the accompanying drawing wherein:

The figure is a schematic process flow diagram of the process and apparatus of the present invention.

Referring more in detail to the drawing:

The main gas stream which is to be processed by the present invention flows through main gas inlet 1 into the power end of gas driven blower 2. The main gas stream exhausts from blower 2 into main gas inlet header 3. Adsorption vessels (herein referred to as sorbers) 4, 5 and 6 are connected to main gas inlet header 3 through ducts 7, 8 and 9 respectively which are controlled by valves 10, 11 and 12 respectively.

In operation the main gas stream initially flows through inlet header 3, duct 7 and valve 10 into sorber 4. In passing through sorber 4 the main gas stream is denuded of its heavier hydrocarbons and water. The adsorbents contemplated by the present invention have a greater affinity for the heavier hydrocarbons than the lighter ones generally in reverse order of their vapor pressures. In the process of the present invention it is necessary that some means be provided to switch the main gas stream from one sorber to another when the outlet portion of the adsorbent bed of the sorber on stream is substantially saturated with respect to the desirable outlet concentration of the lightest of the hydrocarbons which are to be recovered. At this condition the adsorbent bed will contain water and the heaviest hydrocarbons near the adsorbent bed inlet with gradually lighter hydrocarbons deposited as the outlet is approached. From the foregoing it is evident that adequate control should be provided to switch the main gas stream from one sorber to another at the proper time. No such control is shown in the attached figure but a timing control or a control which senses the approach of saturation near the outlet end of the adsorbent bed by the lightest of the hydrocarbons to be recovered would be satisfactory to the operation of the present invention. It is also suggested that the timing of the system of the present invention may be controlled by sensing the temperature of the outlet gas from the sorber being regenerated. This temperature when it reaches the preset switching temperature will assure that the adsorbent material within the sorber will have been as completely regenerated as is desired by the process and therefore signal that the system is ready for switching to the next portion of the process cycle.

Flow of the denuded main gas stream from sorber 4 is through outlet duct 13 and valve 14 into main gas outlet header 15. The denuded main gas stream is then conducted to a pipeline or other destination (not shown). Outlet ducts 16 and 17, controlled by valves 18 and 19, extend from sorbers 5 and 6 respectively to outlet header 15.

With the process of the present invention in operation as described above, i.e. sorber 4 on stream adsorbing desired hydrocarbons from the main gas stream, sorber 5 will be in its cooling cycle, having just been regenerated and sorber 6 will be in its regeneration cycle. Regeneration gas is withdrawn from the main gas stream at point 20 and conducted through duct 21 into blower 2. Blower 2 is utilized to take a small minimum pressure drop in the main gas stream to boost the pressure of the regeneration gas stream thereby minimizing the usual pressure drop which has to be taken to cause the regeneration gas stream to flow through the regeneration and cooling system in an open type regeneration system. For example, it may be assumed that approximately one-half of the main gas stream will be required for the regeneration system and that the blower 2 has an efficiency of fifty percent. In such case if a pressure differential of fifteen pounds per square inch were required for adequate regeneration and cooling, then a pressure drop of the main gas stream of ten pounds per square inch on the power end of blower 2 would provide an increase of five pounds per square inch in the regeneration gas stream and a total pressure drop available for the operation of the regeneration gas stream of fifteen pounds per square inch.

Bypass line 22 is connected around blower 2 and is controlled by valve 23. Line 24 connects the actuator of valve 23 into flow sensing device 25 which is positioned in line 26. Thus, if blower 2 is delivering excess gas through line 26, valve 23 will be opened allowing some gas to flow from the discharge of the inlet of blower 2.

From blower 2 regeneration gas flows through duct 26, heat exchanger 27 and duct 28 into heater 29. The hot regeneration gas flowing from heater 29 is conducted through regeneration gas header 30 into duct 31, 32 or 33 depending on which of valves 34, 35 or 36 in ducts 31, 32 and 33 respectively is open. Ducts 31, 32 and 33 connect header 30 to sorbers 4, 5 and 6 respectively. Ducts 37, 38 and 39 connect sorbers 4, 5 and 6 into header 40 and are controlled by valves 41, 42 and 43. With the process of the present invention in operation as hereinbefore described, valves 36 and 43 will be open and valves 34, 35, 41 and 42 will be closed. Thus, hot regeneration gas will flow through the adsorbent bed within sorber 6, vaporizing the adsorbed hydrocarbons and water and carrying these vaporized constituents through duct 39, valve 43, header 40 and cooling condenser 44 into separator 45. Liquids separated from the regeneration gas stream within separator 45 may be discharged through liquid outlet 46. If desired, the condensed liquid hydrocarbons may be separated from the condensed water in separator 45 and separately discharged therefrom without deviating from the present invention.

The liquid free regeneration gas is discharged from separator 45 through gas outlet 47 into cooling gas header 48. Ducts 49, 50 and 51 controlled by valves 52, 53 and 54 respectively connect from header 48 into sorbers 4, 5 and 6 as shown. Since sorber 5 should be cooled, valve 53 will be open and valves 52 and 54 will be closed allowing cooling gas to flow through duct 50 into sorber 5. Cooling gas is conducted from sorbers 4, 5 and 6 through ducts 55, 56 and 57 respectively into header 58 under control of valves 59, 60 and 61. Thus, with sorber 5 being cooled, gas will be conducted through duct 56, valve 60, header 58, heat exchanger 27, cooler 62 and three-way valve 64 into main gas inlet header 3 at point 63 as shown or through line 65 into main gas outlet header 15. Three-way valve 64 controls the flow of the regeneration gas either to return to the main gas stream ahead of the sorber which is on stream or directly to main gas outlet 15. The return of the regeneration gas stream to main gas outlet 15 is generally preferred since it will have the advantage of reducing the design capacity of the sorbers by the amount of regeneration gas flowing through the system. The volume of regeneration gas will normally be approximately twenty-five percent of the flow of the main gas stream depending upon the hydrocarbon and water content of the main gas stream and other variables.

In operation, cooling condenser 44 should be operated at a temperature sufficiently low to condense the desired heavier hydrocarbons from the regeneration gas stream. These condensed hydrocarbons will be separated from the regeneration gas in separator 45. The cooling of the regeneration gas by cooling condenser 44 will cause much of the water vapor in the regeneration gas to condense. This condensed water will be discharged with the other condensate from separator 45 through liquid outlet 46. It should be noted, however, that the major portion of the water will readily separate from the liquid hydrocarbons and may be discharged separately from separator 45.

The regeneration gas flowing from separator 45 is relatively free of condensable hydrocarbons and water vapor because of its reduced temperature. Care should be taken in the design of separator 45 to prevent any carryover of entrained liquids in the regeneration gas flowing therefrom. Being substantially free of entrained liquids and at a reduced temperature, the regeneration gas is then used to cool a bed of adsorbent material which has been regenerated with a hot regeneration gas. Cooling the regenerated bed of adsorbent material with a regeneration gas stream relatively free of liquids and vapors of the desirable heavier hydrocarbons and water is advantageous because the bed of adsorbent material will not adsorb as much water and hydrocarbons as it would if the regeneration gas were taken directly from the main gas stream for cooling purposes. Some partial presaturation occurs in open type regeneration systems of the prior art in which the regeneration gas stream initially flows through the recently regenerated bed to cool the bed and to preheat the regeneration gas. When the cooling of the bed in these prior systems is almost complete, the cooling stream, being saturated with water vapor and vapors of condensable hydrocarbons, will cause a portion of the bed being cooled to become saturated before the main stream is connected into the bed. This partial presaturation of the bed of adsorbent material will shorten the length of time available for regeneration and will increase the heating capacity and the circulation capacity necessary for proper regeneration. With the regeneration system of the present invention this partial presaturation of the adsorbent material during regeneration cooling is reduced to a point where maximum economy may be achieved.

It is further necessary to cool the regeneration gas leaving the hot regenerated sorber so that the temperature of the main gas stream will not be raised to a temperature at which the adsorbent material begins to lose its adsorption capacity or to a temperature higher than the temperature allowed for the main gas stream to be delivered to the main gas outlet header. Heat exchanger 27 and cooler 62 are provided to cool the regeneration gas before its reintroduction into the main gas stream.

Following is a table illustrating the temperatures of the gas stream in a typical system operated in accordance with the present invention wherein the regeneration gas stream is delivered to the main gas outlet header rather than to the main gas stream ahead of the sorber on stream. This table shows the temperatures of the gas stream at different intervals during a typical fifteen minute cycle of a system using approximately twenty-five percent of the main gas stream for regeneration and cooling gas. In the table the temperatures designations have the following meaning: T-1 is the temperature of the cooling gas stream leaving the sorber being cooled. T-2 is the temperature of the regeneration gas stream prior to entering the heater. T-3 is the temperature of the regeneration gas stream before it is combined with the main gas stream in the main gas outlet header. T-4 is the temperature of the regeneration gas stream entering the sorber being heated. T-5 is the temperature of the regeneration gas stream leaving the sorber being heated. T-6 is the temperature of the regeneration gas stream leaving the separator and prior to entering the sorber being cooled. T-7 is the temperature of the main gas stream leaving the sorber and prior to being combined with the regeneration gas stream in the main gas outlet header. T-8 is the temperature of the combined main gas stream and regeneration gas stream in the main gas outlet header. It is assumed that the temperature of the main gas stream entering the system is 90 degrees F. All temperatures are in degrees F.

|     | Time, Minutes | | | | |
|-----|-----|-----|-----|-----|-----|
|     | 0 | 3½ | 7 | 12½ | 15 |
| T-1 | 450 | 310 | 220 | 170 | 153 |
| T-2 | 430 | 295 | 210 | 161 | 145 |
| T-3 | 100 | 98 | 96 | 95 | 94 |
| T-4 | 600 | 600 | 600 | 161 | 145 |
| T-5 | 92 | 180 | 260 | 395 | 450 |
| T-6 | 80 | 83 | 85 | 88 | 100 |
| T-7 | 153 | 128 | 108 | 95 | 90 |
| T-8 | 140 | 121 | 99 | 95 | 92 |

It should be noted that the system from which the above table was taken was provided with a heater by-pass line. This heater by-pass line allows the regeneration gas to flow through the heater for only a sufficient amount of time to provide adequate regeneration of the sorber being heated. This actuation of the heater by-pass line is normally controlled by a three-way valve at the inlet to the heater and may be responsive to the timing of the cycle or to the outlet temperature of the regeneration gas from the sorber being heated.

The use of a circulating means for regeneration gas such as blower 2 has been found to be advantageous as previously mentioned. It will allow the use of a small pressure drop in the main gas stream to provide the necessary energy for circulation of the regeneration gas stream. The present invention saves a portion of pressure available in the main gas stream in those instances where an open type regeneration system would be used and further will make available an open type regeneration system for many installations where systems of the prior art would require a separate power source which will be a continuing expense thereby decreasing the profit from the recoveries of the process. Also, the amount of pressure which is to be created by blower 2 in the system of the present invention is greatly reduced when the regeneration gas stream is discharged into the main gas outlet header. In such case the pressure required to circulate the regeneration gas is only sufficient to cause the desired amount of regeneration gas to circulate through the regeneration system less the amount of pressure drop of the main gas stream flowing through the sorber on stream.

The following is a specific example illustrating the specific recoveries that will be achieved by use of the present invention and is compared to the recoveries that could be achieved by the use of a system of the prior art. In this example, two system are being operated under identical conditions to process a natural gas stream for the recovery of the desirable hydrocarbons contained in the natural gas stream with the exception that the system operating in accordance with the present invention withdraws a regeneration gas stream from the inlet gas stream, as a portion thereof heats it to 600° F. and then passes the heated gas through one of the sorbers which has been previously saturated with the hydrocarbons which are to be recovered and with water. This regeneration gas stream is then cooled, the condensed liquids are separated therefrom and the stream is conducted through a sorber which has been previously regenerated to cool the adsorbent material therein. The regeneration gas is then returned to the main gas stream at a point ahead of the sorber to which it is to flow or it is delivered to the main gas outlet header.

In the system of the prior art the regeneration gas is withdrawn from the inlet gas stream and is then conducted through a hot sorber which has been regenerated to cool the adsorbent material therein. On discharge from the sorber being cooled, the regeneration gas stream is heated further and then conducted to a sorber which has been previously saturated with the hydrocarbons which are to be recovered and with water. On discharge from this second sorber the regeneration gas is cooled and the condensed liquids are separated from the stream before it is conducted into the inlet gas stream at a point ahead of the sorber to which it is to flow.

A typical example of flowing condition to which these two systems might be applied is a natural gas stream having a pressure of 800 pounds per square inch, a temperature of 90° F., and a flow rate of 25 million standard cubic feet per day. In such a natural gas stream there will be 75 barrels per day of recoverable hydrocarbons including the pentanes and heavier components of the natural gas stream.

The above described system of the prior art will process the above described natural gas stream and will recover 49 barrels of condensate (excluding water) per day of operation and provide an outlet water dew point of 30° F. The system operated in accordance with the present invention will process the above described natural gas stream and will recover 54 barrels of condensate (excluding water) per day of operation and provide outlet water dew point of 30° F. From this it can be seen that there is an increase in recovery amounting to ten percent by using the process of the present invention as compared to the process of the prior art.

If the same gas stream is processed except that the inlet temperature is 115° F., then the recovery of the prior art process will be 43 barrels per day and the recovery of the present invention process will be 49 barrels per day.

It has been established by correlation of data taken on such units actually operated to recover hydrocarbons from a natural gas stream in accordance with the present invention will always show at least five percent increase in hydrocarbon recovery as compared to the system of the prior art.

From the foregoing description it may be seen that the present invention provides a process and apparatus for recovering desirable hydrocarbons from a natural gas stream having an open type regeneration system with greatly improved means of limiting the pressure drop on the main gas stream to power the regeneration gas stream. The present invention also provides a regeneration system in which the cooling of the regenerated adsorbent material does not result in as much partial presaturation of the adsorbent material.

Also, it has been established that delivering the regeneration gas stream to the main gas stream after it has been processed will result in allowing the use of beds of adsorbent material which are smaller in direct proportion to the amount of the regeneration gas stream. With the smaller beds of adsorbent material the regeneration system will be less costly to operate since the regeneration system and the amount of regeneration gas flow will be reduced because of the smaller beds of adsorbent material. Another advantage of discharging the regeneration gas stream into the main gas outlet header is that not as much cooling of the sorber will be required since the introduction of the cooling gas will have a cooling effect on the main gas stream discharger from the sorber which is on stream. In this manner the limiting temperature to which a sorber must be cooled will be the temperature at which the adsorbent material will adequately process the main gas stream and not the main gas stream temperature at the outlet of the sorber. The introduction of the regeneration gas stream into the main gas outlet header will thereby assist in keeping the temperature of the gas stream discharged from the system below the maximum temperature limitation which is normally placed on such outlet gas temperature.

What we claim and desire to secure by Letters Patent is:

1. In a continuous cyclic process for processing a natural gas stream in a system containing at least three adsorbent beds wherein each of said beds passes consecutively through an adsorption cycle, an open type heating cycle, and an open type cooling cycle, the improvement comprising, separating said natural gas stream into first and second portions, passing said first portion through the bed which is on the adsorption cycle to remove condensables from the first portion thereby providing a stripped gas leaving said first bed, simultaneously passing said second portion successively and in series through a heater to provide a hot regeneration gas, through another bed of adsorbent material which was substantially saturated with said condensables during a previous adsorption cycle thereby driving off the condensables in said bed, through a cooler to condense the condensables removed from the bed and to partially condense condensables in said second portion and cool said second portion, through a separator to separate the resulting liquid condensate from the now cooled gas, and then through a third bed from which said condensables had been removed by heating during a previous heating cycle thereby cooling said third bed and adsorbing condensables from said second portion, and then directing said now stripped gas from the third bed to the stripped gas leaving said first bed.

2. The process according to claim 1 wherein the gas from said third bed is passed in heat exchange relation to said second portion of gas prior to the passage of said second portion to the heater thereby preheating said second portion on the way to the heater, but cooling the second portion leaving the third bed prior to its co-mingling with the stripped gas from the first bed.

3. The process of claim 1 wherein the first and second portions are respectively adjusted to provide a pressure differential between the first and second portions with the second portion having a higher pressure relative to the first portion.

4. In a cyclic process for adsorbing components from natural gas wherein a feed gas stream is passed through a system containing at least three adsorbent beds wherein each of the beds passes consecutively through an adsorption cycle, an open type heating cycle, and an open type cooling cycle, the improvement comprising, separating said stream into two portions and adjusting the respective pressures thereof so as to provide a pressure differential resulting in a high pressure and a low pressure stream;

passing said low pressure portion of natural gas during an adsorption cycle through a first bed of adsorbent material to remove said components from said stream and substantially to saturate said adsorbent material with said components, and withdrawing a stripped gas from said first bed;

heating the high pressure portion of natural gas to provide a hot regeneration gas, passing said hot regeneration gas through a second bed of adsorbent material substantially saturated with said components during a previous adsorption cycle, withdrawing from said second bed a gas enriched in said components, cooling said enriched bed to condense said certain components and remove condensables from the high pressure portion, separating the resulting cooled mixture into a liquid condensate and a relatively cool gas, passing said cool gas through a relatively hot third bed of adsorbent from which said components have been removed by heating during a previous heating cycle thereby cooling said bed and adsorbing condensables from said second gas portion warming up said second gas portion, removing the resulting warm gas from said third bed; and co-mingling said warm gas with the low pressure gas stream leaving said first bed.

5. The invention of claim 4 wherein the warm gas withdrawn from the bed being cooled is conducted into a heat exchange relationship with said high pressure gas portion prior to the heating of said high pressure gas portion whereby the high pressure gas portion is preheated and the warm gas is cooled.

6. In an adsorption apparatus for the recovery of condensables from a natural gas stream which includes at least three beds of adsorbent material for removing the condensables by passing a first portion of the stream sequentially through the first of said beds and where the beds are simultaneously and continuously but sequentially being connected to circuits of adsorption, heating, and cooling, the improvement in the regeneration circuit which includes a heating circuit and a cooling circuit connected in series comprising, conducting means in said regeneration circuit adapted to conduct a second portion of said natural gas stream in series and sequentially through said heating circuit and said cooling circuit, heating means positioned in said conducting means for heating said second portion, a second bed which has previously been in the adsorption circuit positioned in said conducting means at a point downstream from said heating means for heating and removing the condensables from the second bed, cooling means positioned in said conducting means at a point downstream from said second bed for condensing condesables removed from said second bed and condensing condensables in said second gas portion and cooling the second gas portion, a gas-liquid separator means positioned in said conducting means at a point downstream from said cooling means for separating the condensed liquids from the cooled gas, a third adsorbent bed which has been previously in the heating circuit positioned in said conducting means at a point downstream from said separator whereby the cooled gas cools said third bed and adsorbs condensables from the second gas portion, heat exchange means in said conducting means at a point downstream from said third bed in heat exchange relationship with said conducting means at a point upstream from said heater, and said conducting means connected to the first stream portion at a point downstream from said first bed.

7. The apparatus of claim 6 including pressure adjusting means for increasing the pressure of said second gas portion relative to said first gas portion.

References Cited by the Examiner

UNITED STATES PATENTS

| | | | |
|---|---|---|---|
| 2,823,764 | 2/1958 | Miller | 55—62 X |
| 2,919,164 | 1/1960 | Dillman et al. | 55—62 X |
| 2,957,544 | 10/1960 | Baker | 55—62 X |
| 2,995,208 | 8/1961 | Hachmuth | 55—62 X |
| 3,093,465 | 6/1963 | Latta | 55—60 |

REUBEN FRIEDMAN, *Primary Examiner.*